Sept. 26, 1939.    J. B. SINDERSON    2,174,344
HYDRAULIC CLUTCH
Filed March 13, 1939
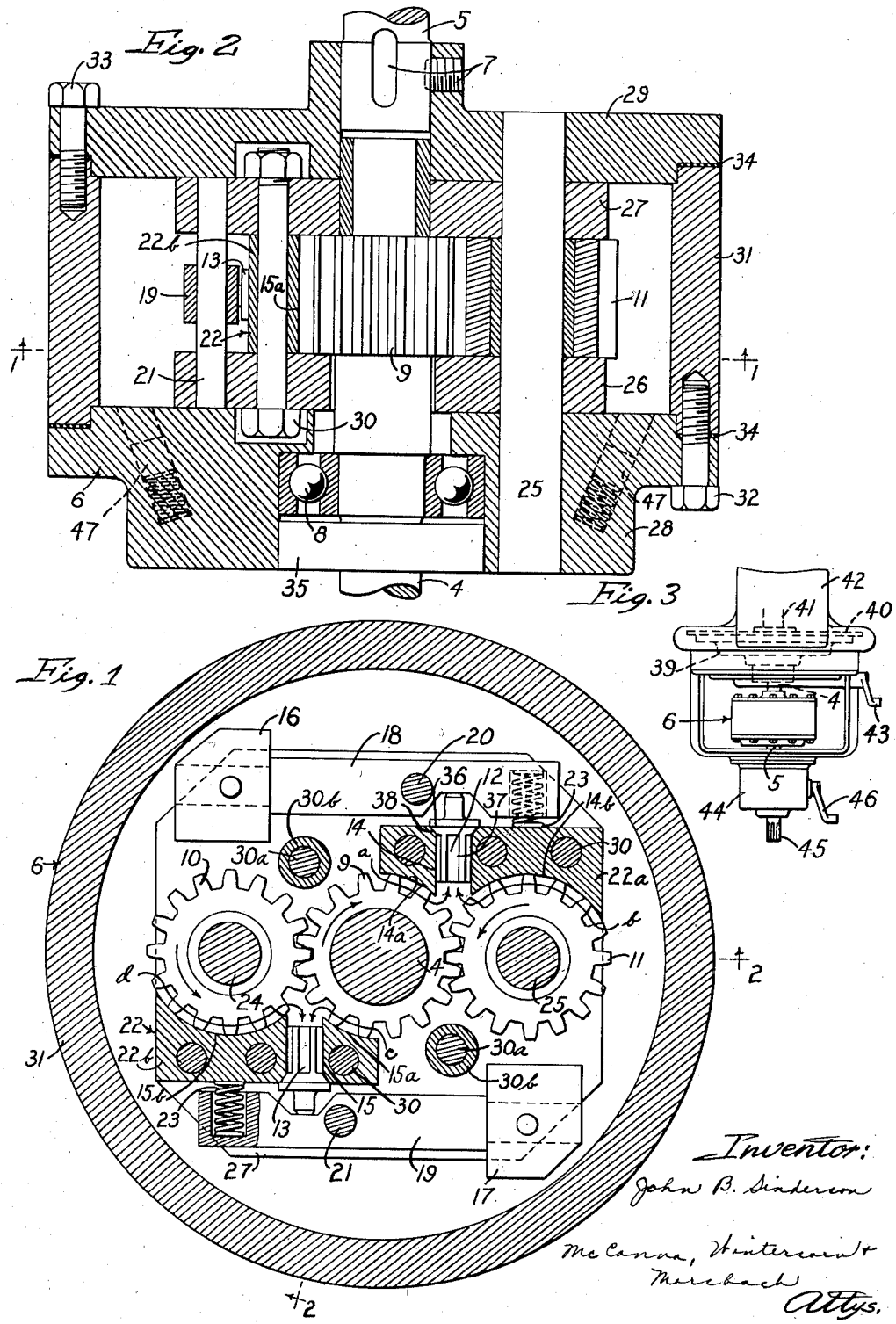

Patented Sept. 26, 1939

2,174,344

UNITED STATES PATENT OFFICE 2,174,344

HYDRAULIC CLUTCH

John B. Sinderson, Rockford, Ill.

Application March 13, 1939, Serial No. 261,571

5 Claims. (Cl. 192—61)

This invention relates to a new and improved hydraulic clutch.

The principal object of my invention is to provide a simpler and more practical form of hydraulic clutch than has been available heretofore, so far as I am aware, and with that object in view I provide a double gear type oil pump having automatic chokes on the discharge sides thereof controlled centrifugally so that as the driven member picks up speed the choking action is increased until finally at a certain speed there is no further discharge permitted and the device operates with direct drive.

Other objects and advantages of my invention will appear hereinafter as reference is made in the description to the accompanying drawing, in which—

Fig. 1 is a transverse section through a hydraulic clutch made in accordance with my invention, the view being taken on the line 1—1 of Fig. 2;

Fig. 2 is a longitudinal section on the broken line 2—2 of Fig. 1, and

Fig. 3 is a diagrammatic plan view of a transmission illustrating how the present device is intended to be used.

The same reference numerals are applied to corresponding parts throughout the views.

The driving shaft is indicated at 4 in Fig. 2 and the driven shaft at 5, in coaxial relation to one another and to the housing 6 which is fixed to turn with the shaft 5, as indicated at 7, and has an anti-friction bearing 8 to allow for relative rotation between the driving shaft 4 and the housing. As previously indicated, the present device consists of a double gear type oil pump in which the gear 9 is common to gears 10 and 11. 12 and 13 are automatic choke valves regulating the oil discharge from the pumps through ports 14 and 15, respectively. 16 and 17 are centrifugal flyweights carried on arms 18 and 19 pivoted at 20 and 21 in the pump housing 22 and normally urged inwardly by the action of coiled compression springs 23, whereby the choking action of the valves 12 and 13 is increased by centrifugal action as the speed of the driven shaft 5 increases, until at a predetermined speed of the driven shaft 5 the valves completely cut off discharge from the ports 14 and 15, whereupon the shaft 5 is in direct drive relation to the shaft 4.

The gear 9 is suitably fixed to the drive shaft 4, whereas the gears 10 and 11 are idlers running freely on through-shafts 24 and 25. These shafts extend through the face plates 26 and 27 of the gear pump and are suitably anchored in holes in the face plates 28 and 29 of the housing 6. Recesses are provided in the face plates 28 and 29 to accommodate the heads and nuts of the through bolts 30 which fasten the face plates 26 and 27 to the two blocks 22a and 22b forming parts of the pump housing 22. The ports 14 and 15, previously referred to, are provided in the blocks 22a and 22b, respectively, the port 14 opening between arcuate inner faces 14a and 14b provided on the block 22a in close working abutment with the periphery of the teeth of the gears 9 and 11, respectively, and the port 15 opening between arcuate inner faces 15a and 15b provided on the block 22b in close working abutment with the periphery of the teeth of the gears 9 and 10. Other through bolts 30a cooperate with spacer sleeves 30b to fasten the face plates 26 and 27 together on the diametrically opposite sides of the gears 10 and 11 from the blocks 22a and 22b. The face plates 26 and 27 extend beyond the pump housing 22 to provide supports for the pivot pins 20 and 21 on which the centrifugal weight arms 18 and 19 are carried, and the weights 16 and 17 on these arms operate freely between the face plates and keep the arms centered on their pivot pins and in proper operating relationship to the choke valves 12 and 13. The face plates 28 and 29 are bolted to the opposite sides of the circumferentially extending intermediate wall 31 of the housing 6, as indicated at 32 and 33. The housing 6 contains all of the oil used and is kept oil tight by gaskets 34 and by a retainer 35. The paths of the incoming oil for the pump 9—11 are indicated by the arrows $a$ and $b$, while arrows $c$ and $d$ indicate the incoming oil for pump 9—10, and it is obvious that the choke valves 12 and 13 serve to regulate the discharge from these pumps through the ports 14 and 15, respectively. The choke valves have poppet type head portions 36 and fluted shanks 37 serving as guides for the valves in the ports 14 and 15 while providing discharge passages through the flutes thereof for the oil flowing through the ports. The tapered seats 38 provided at the outer ends of the ports 14 and 15 permit fluid tight seating of the valves.

Fig. 3 illustrates the relationship of the housing 6 of the present device to the friction clutch 39, flywheel 40, and crank shaft 41 of the internal combustion engine or prime mover 42. The driving shaft 4, previously mentioned, has drive transmitted thereto when the clutch 39 which is under the control of a clutch pedal actuated lever 43 is engaged. The driven shaft 5, previously mentioned, extends rearwardly into the reverse gear box 44 to transmit forward or reverse drive to the propeller shaft 45, depending upon the position of the manually operated shift lever 46, which also has a neutral position wherein the shaft 5 is disconnected from the shaft 45.

In operation, assuming that the engine 42 is idling and that the lever 46 is in neutral position, the car being at a standstill, the operator will depress the clutch pedal to disengage the clutch 39 by means of lever 43 so as to permit shifting the reverse gear lever 46 from neutral to forward or reverse position, depending upon the direction in which the car is to be driven. Assuming that the lever 46 is shifted to the forward drive position, the operator can then engage the clutch 39 and the car will move forward at low speed, similarly as where the first speed is engaged in the case of a standard automobile transmission. While the engine is running slowly, the gears 10 and 11 turn slowly and oil is pumped through the discharge ports 14 and 15 and is continuously circulated in the housing 6 in the manner indicated by the arrows a, b, c and d. As the engine speed is increased by depression of the accelerator pedal, the amount of oil pumped becomes too great to discharge freely back into the housing 6, and, as a result, a back pressure is set up against the teeth of the gears 10 and 11 with the result that torque is transmitted to a steadily increasing degree from the drive shaft 4 to housing 6, and accordingly to the driven shaft 5. Now, as the housing 6 picks up speed, the centrifugal weight arms 18 and 19 swing outwardly against the restraint of springs 23 and close the choke valves 12 and 13, thereby causing a still higher back pressure against the teeth of the gears 10 and 11. Finally, at a predetermined speed of the housing 6 and driven shaft 5, the choke valves 12 and 13 are closed completely and the gears 10 and 11 are locked in direct drive relation to the gear 9, and the driven shaft 5 turns at the same speed as the drive shaft 4. The smoothness of the acceleration depends upon the proper proportioning of the area of the valves 12 and 13 and the weight and leverage of the centrifugal valve actuating arms 18 and 19, and the proportioning is such that direct drive is attained at a desirable engine speed equivalent to a moderate road speed of the automobile. Inasmuch as the housing 6 is filled with oil, the gear teeth are always assured of a full supply of oil up to the line of engagement with each other, and, while I believe that simply filling the housing with oil at atmospheric pressure will be found sufficient, it will, of course, be understood that I may provide spring-loaded plungers at one or more convenient points in the housing 6, as, for example, at 47 in the face plate 28, and have the housing filled with oil under pressure whereby in the event of leakage the oil is automatically replaced by oil from these reserve chambers.

It is believed the foregoing description conveys a good understanding of the objects and advantages of my invention. The appended claims have been drawn with a view to covering all legitimate modifications and adaptations.

I claim:

1. In a power transmitting device, the combination of coaxially arranged driving and driven shafts, a main outer housing turning with the driven shaft comprising spaced face plates and a circumferentially extending intermediate wall, means securing said face plates together in assembled relation to said intermediate wall, an inner pump housing comprising spaced face plates abutting the inner sides of the other face plates and a plurality of equally circumferentially spaced pump housing blocks disposed between said pump housing face plates, means securing said face plates together in assembled relation to said blocks, a central drive gear turning with said driving shaft between the latter face plates, said pump housing blocks having inner arcuate faces in close working abutment with the periphery of the teeth thereof and having other arcuate inner faces for companion pumping gears, companion pumping gears abutting said last named arcuate faces peripherally and meshing with said first gear, said blocks having discharge ports provided therein opening from between said arcuate faces, and valve means for regulating the discharge of fluid from said ports so as to regulate the transmission of torque from the driving to the driven shaft.

2. In a power transmitting device, the combination of coaxially arranged driving and driven shafts, a main outer housing turning with the driven shaft comprising spaced face plates and a circumferentially extending intermediate wall, means securing said face plates together in assembled relation to said intermediate wall, an inner pump housing comprising spaced face plates abutting the inner sides of the other face plates and a plurality of equally circumferentially spaced pump housing blocks disposed between said pump housing face plates, means securing said face plates together in assembled relation to said blocks, a central drive gear turning with said driving shaft between the latter face plates, said pump housing blocks having inner arcuate faces in close working abutment with the periphery of the teeth thereof and having other arcuate inner faces for companion pumping gears, companion pumping gears abutting said last named arcuate faces peripherally and meshing with said first gear, said blocks having discharge ports provided therein opening from betwen said arcuate faces, and automatic centrifugally operated valve means responsive to changes in speed of rotation of said housing to restrict the discharge of fluid from said ports more and more as the speed of rotation of said housing increases.

3. A power transmitting device as set forth in claim 2, wherein said automatic centrifugally operated valve means comprises a choke valve in each of the discharge ports, a weighted pivoted valve actuating arm operatively associated with each of said choke valves to close the same upon outward movement of the arm under centrifugal force, and spring means associated with each of said arms normally urging the same in the opposite direction.

4. A power transmitting device as set forth in claim 2, wherein said automatic centrifugally operated valve means comprises a choke valve, a weighted arm operatively associated with said choke valve and pivotally mounted between the face plates of the pump housing so as to move the choke valve inwardly toward closed position upon outward pivotal movement of said arm under centrifugal force, and a coiled compression spring acting between said arm and the pump housing block normally tending to move the arm in the opposite direction.

5. In a power transmitting device, the combination of a rotary housing adapted to contain working fluid, a drive gear, a driven idler gear meshing with the drive gear and mounted for rotation in said housing, a pump block mounted in said housing having two arcuate inner faces concentric with said gears and in close working contact with the peripheries of the teeth thereof, said block having a discharge port opening between said arcuate faces, a choke valve slidable in said port, a valve actuating arm pivoted in said housing in fixed relation to said port to move the valve toward closed position in the pivotal movement of said arm in one direction, a weight on one end of said arm causing such pivotal movement under centrifugal force in the rotation of said housing, and spring means normally tending to move said arm in the opposite direction.

JOHN B. SINDERSON.